(12) United States Patent
Okada

(10) Patent No.: US 7,893,824 B2
(45) Date of Patent: Feb. 22, 2011

(54) ALARM CONTROL APPARATUS

(75) Inventor: Satoshi Okada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1115 days.

(21) Appl. No.: 11/429,059

(22) Filed: May 4, 2006

(65) Prior Publication Data

US 2006/0255926 A1  Nov. 16, 2006

(30) Foreign Application Priority Data

May 12, 2005 (JP) ............................. 2005-139255

(51) Int. Cl.
*G08B 29/00* (2006.01)
(52) U.S. Cl. .................... 340/506; 340/511; 340/532; 340/538; 340/3.1; 702/182; 702/186; 702/188; 702/179
(58) Field of Classification Search .............. 340/506, 340/511, 532, 538, 3.1; 702/182, 186, 188, 702/179
See application file for complete search history.

(56) References Cited

U.S. PATENT DOCUMENTS

| | | | |
|---|---|---|---|
| 4,933,885 A * | 6/1990 | Kato et al. .................. 700/286 |
| 5,661,463 A * | 8/1997 | Letchak et al. ........ 340/636.15 |
| 6,006,019 A * | 12/1999 | Takei ......................... 709/224 |
| 6,178,362 B1 * | 1/2001 | Woolard et al. ............. 700/295 |
| 6,950,766 B2 * | 9/2005 | Okamoto et al. .............. 702/81 |
| 6,965,308 B2 * | 11/2005 | Fukuda et al. .............. 340/506 |
| 7,085,674 B2 * | 8/2006 | Iwasawa ..................... 702/179 |
| 2002/0174347 A1 * | 11/2002 | Ting .......................... 713/186 |
| 2003/0040929 A1 * | 2/2003 | Knegendorf et al. ........... 705/1 |

FOREIGN PATENT DOCUMENTS

| JP | 3044797 A | 2/1991 |
|---|---|---|
| JP | 11231924 A | 8/1999 |
| JP | 2002268961 A | 9/2002 |
| JP | 2004133671 A | 4/2004 |
| JP | 2005050274 A | 2/2005 |
| JP | 2005-84774 | 3/2005 |

OTHER PUBLICATIONS

Japanese Office Action dated Nov. 10, 2009, issued in corresponding Japanese Patent Application No. 2005-139255.

* cited by examiner

*Primary Examiner*—Tai T Nguyen
(74) *Attorney, Agent, or Firm*—Westerman, Hattori, Daniels & Adrian, LLP

(57) ABSTRACT

An alarm control apparatus which collects alarms from an equipment of a plant and handles the alarms includes a support information collecting section which adds support information for managing the equipment to the alarms.

6 Claims, 4 Drawing Sheets

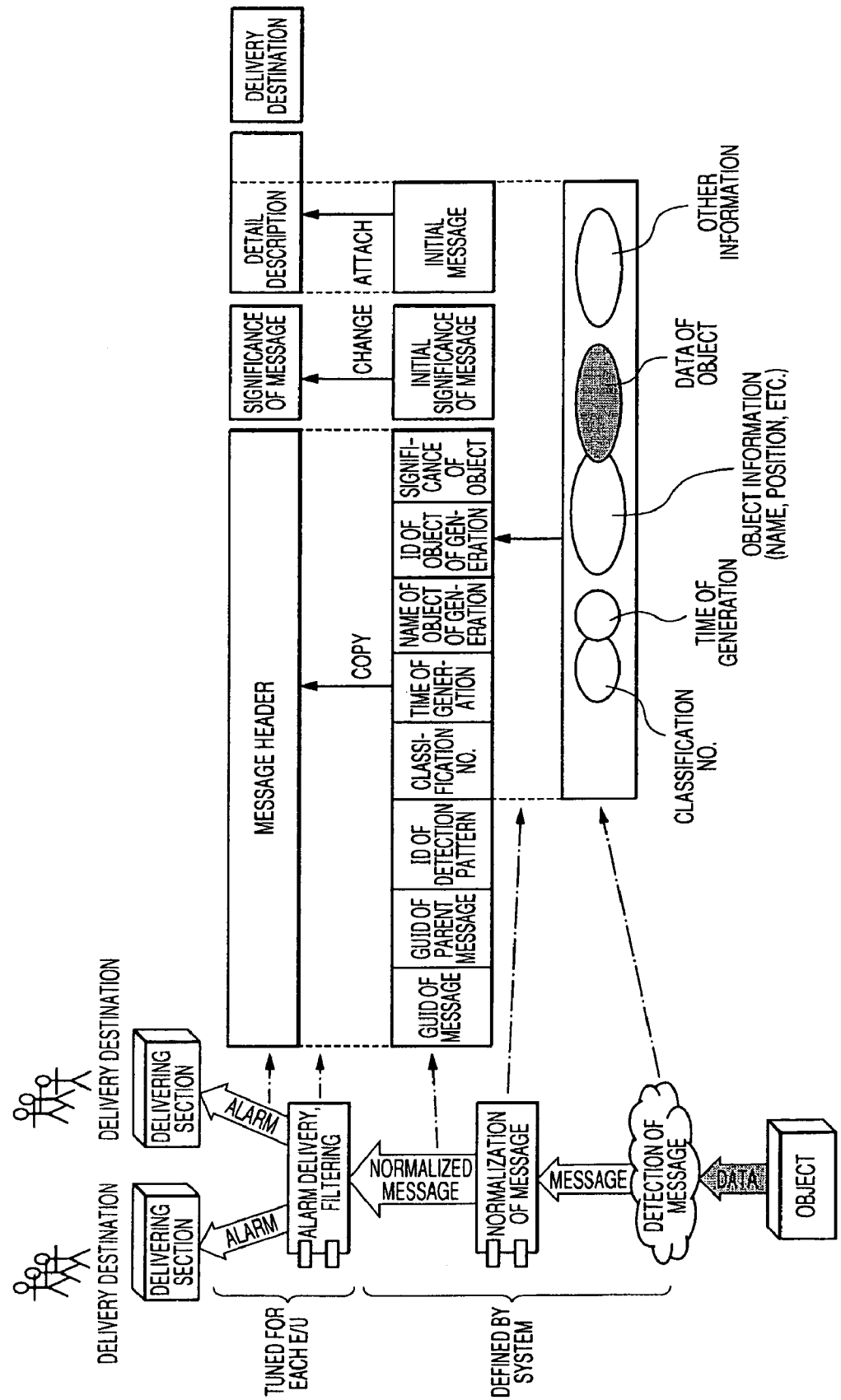

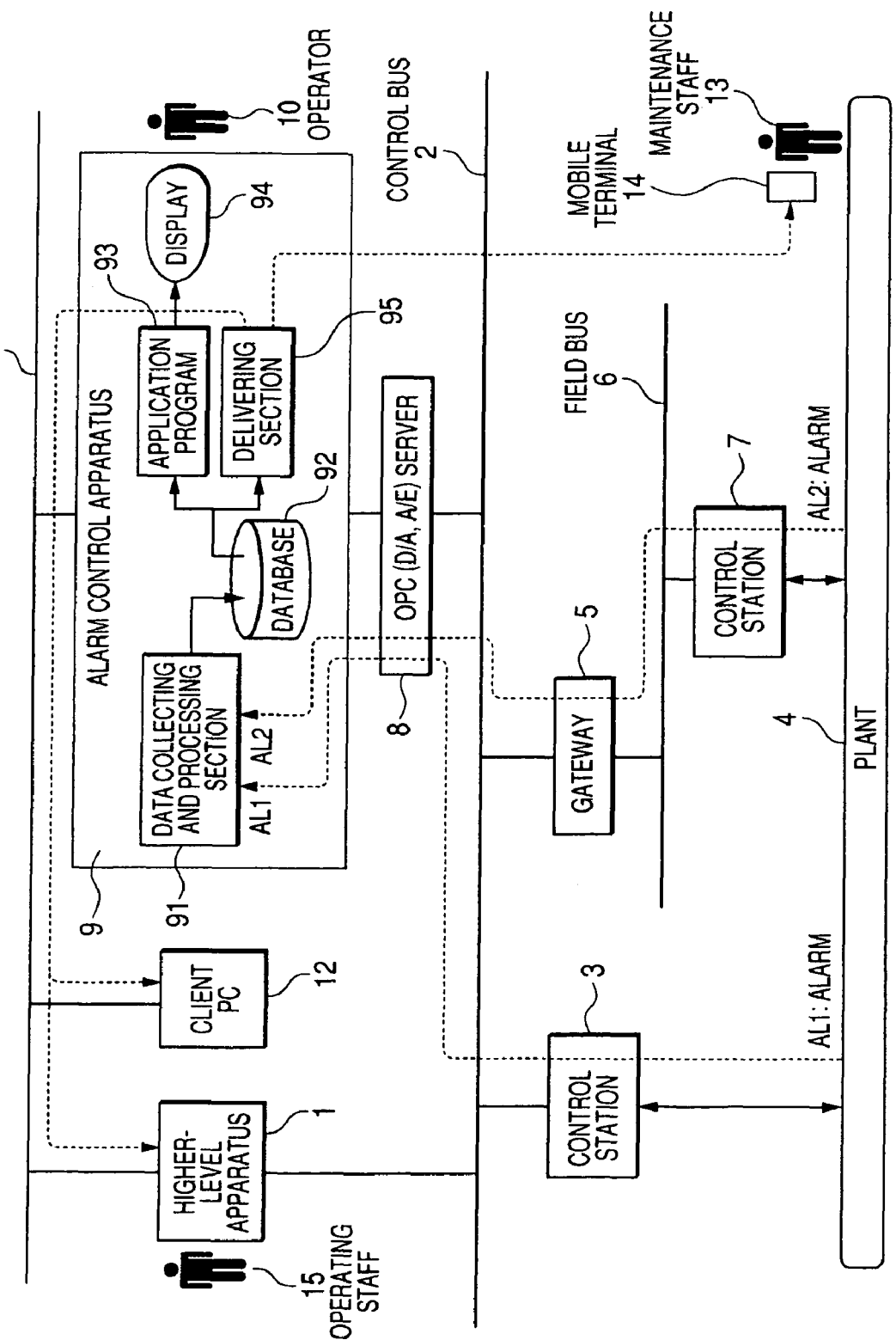

ALARM CONTROL APPARATUS

This application claims foreign priority based on Japanese Patent application No. 2005-139255, filed May 12, 2005, the content of which is incorporated herein by reference in its entirety.

BACKGROUND OF THE INVENTION

1. Field of the Invention

The present invention relates to an alarm control apparatus which collects alarms from equipments of a plant, and which handles the alarms.

2. Description of the Related Art

Because of the spread of a distributed control system (hereinafter, abbreviated as DCS) and advancement of a field bus network, recently, self-diagnostic information (a message or an alarm) notified from a field equipment of a plant can be handled on the DCS.

Therefore, alarm control, such as early detection and early response to an abnormality in a field equipment, and integrated management of detailed statuses, is available by using an alarm control apparatus which is typified by a RPM (Plant Resource Manager) connected to the DCS for communication.

FIG. 4 is a functional block diagram showing a configuration example of a DCS to which a related alarm control apparatus is connected. The reference numeral 1 denotes a higher-level apparatus which executes operating and monitoring processes in the DCS, and which is connected to a control bus 2.

The reference numeral 3 denotes a control station which is connected to the control bus 2 to communicate with the higher-level apparatus 1, and also with field equipments (not shown) placed in a plant 4 to execute a control based on an application program.

The reference numeral 5 denotes a gateway which relays communication between the control bus 2 and a field bus 6 that operates on a different standard. The reference numeral 7 denotes a control station which forms a sub system, and which communicates with the higher-level apparatus 1 via the field bus 6 and the control bus 2, and also with field equipments (not shown) placed in the plant 4 to execute a control based on an application program.

The reference numeral AL1 denotes an alarm which is sent from the plant 4 to the control bus 2 via the control station 3, and AL2 denotes an alarm which is sent from the plant 4 to the control bus 2 via the control station 7 and the gateway 5.

The reference numeral 8 denotes an OPC (OLE for Process Control) server which is connected to the control bus 2, which collects the alarms AL1, AL2, and which passes data according to the OPC standard to the alarm control apparatus 9. The reference numeral 10 denotes an operator of the alarm control apparatus 9.

The reference numeral 11 denotes a general-purpose communication bus which is typified by Ethernet (registered trademark), and which is connected to the alarm control apparatus 9 and the higher-level apparatus 1, and 12 denotes a client PC which obtains delivery information from the alarm control apparatus via the general-purpose communication bus 11.

As required, also the higher-level apparatus 1 obtains the delivery information from the alarm control apparatus 9 via the general-purpose communication bus 11. The reference numeral 13 denotes a maintenance staff who patrols and maintains the plant 4, and who obtains the delivery information from the alarm control apparatus 9 via a mobile terminal 14, and 15 denotes an operating staff who operates and monitors the higher-level apparatus 1.

In the alarm control apparatus 9, 91 denotes data collecting and processing section for collecting the alarms AL1, AL2 which are sent from the OPC server 8, for performing required data processing on the alarms, and for storing the alarms into a database 92.

The reference numeral 93 denotes an application program which reads out alarm information of a predetermined time period that is stored in the database 92, which executes a process of analyzing the cause of a fault or the like, and which shows a result of the process to the operator 10 through a display device 94.

The reference numeral 95 denotes delivering section for reading out the alarm information stored in the database 92 on the basis of a predetermined delivery period or a delivery request, and for delivering the alarm information to the client PC 12, the mobile terminal 14 of the maintenance staff 13, and the higher-level apparatus 1.

JP-A-2005-84774 discloses an alarm control system which collects message data of alarms generated in a process, and which analyzes behaviors of the alarms.

In the related alarm control apparatus, only alarms (notifying that communication is disabled, that an equipment is partly broken down, that an equipment is not operating, and the like) generated by equipments of the DCS, and the alarms are delivered to the maintenance staff and clients in their original formats. Moreover, also information output from a program which diagnoses the equipments is collected, and the information is delivered in its original format.

Such modes of collecting and delivering alarms have the following problems.

(1) Information cannot be collected from an equipment which cannot spontaneously generate an alarm, such as an equipment according to HART (highway addressable remote transducer) standard.

(2) An alarm generated by an equipment indicates only the phenomenon that the alarm is generated, and does not include a cause of the occurrence of the phenomenon and information of handling the occurrence of the phenomenon.

(3) Diagnostic information included in an alarm from an equipment does not contain detail information indicating diagnosis contents, and hence the diagnostic information as it is cannot be used as management information.

(4) Information which is related to the status of an equipment, and which is found by a maintenance staff on patrol cannot be handled as an alarm. The information cannot be notified to, for example, all the maintenance staffs or an operating staff, or cannot be managed.

(5) Formats of collected alarms are varied depending on venders of equipments or the like, and not standardized. When the user who uses the information wishes to display the information on a screen or perform a filtering process on the information, therefore, a troublesome process is required.

SUMMARY OF THE INVENTION

The present invention has been made in view of the above circumstances, and provides an alarm control apparatus which can deliver alarms collected from equipments of a plant and also information which is added to the alarms and is effective in equipment management.

In some implementations, an alarm control apparatus of the invention which collects alarms from an equipment of a plant and handles the alarms comprises:

a support information collecting section which adds support information for managing the equipment to the alarms.

The alarm control apparatus of the invention further comprises:

a normalizing section which normalizes the alarms and the support information into a common format.

In the alarm control apparatus of the invention, the support information is information being input manually.

In the alarm control apparatus of the invention, the support information is diagnostic information of the equipment.

In the alarm control apparatus of the invention, the support information is status information of the equipment which is notified by a maintenance staff of the plant.

In the alarm control apparatus of the invention, the support information is periodic patrol information which is notified by a maintenance staff of the plant.

In the alarm control apparatus of the invention, the normalizing section converts the alarms and the support information into the common format which is sectioned by a markup language.

The alarm control apparatus of the invention further comprises:

a filtering section for performing a conditional filtering process on an output of the normalizing section.

As apparent from the above description, the invention can achieve the following effects.

(1) Information related to an equipment which cannot spontaneously generate an alarm, such as an equipment according to HART (highway addressable remote transducer) standard, can be added by manual input.

(2) In addition to an alarm generated by an equipment, the cause of the occurrence of the phenomenon from which the alarm originates, and information of handling the occurrence of the phenomenon can be added by manual input.

(3) Detail information related to diagnosis of an equipment can be added.

(4) Information which is related to the status of an equipment, and which is found by a maintenance staff on patrol can be handled as an alarm. The information can be notified to, all the maintenance staffs or an operating staff, or can be managed. This function is a sole alarm controlling section in an equipment which cannot spontaneously generate an alarm, such as an equipment according to the HART standard.

(5) Collected alarms and the support information are converted into a common format by the normalizing section. When the user who uses the information wishes to display the information on a screen or perform a filtering process on the information, therefore, a troublesome process is not required.

BRIEF DESCRIPTION OF THE DRAWINGS

FIGS. 3A and 3B are image diagrams illustrating data transition from generation of an alarm to delivery of an alarm.

FIG. 4 is a functional block diagram showing a configuration example of a DCS to which a related alarm control apparatus is connected.

DESCRIPTION OF THE PREFERRED EMBODIMENTS

Figure 1:
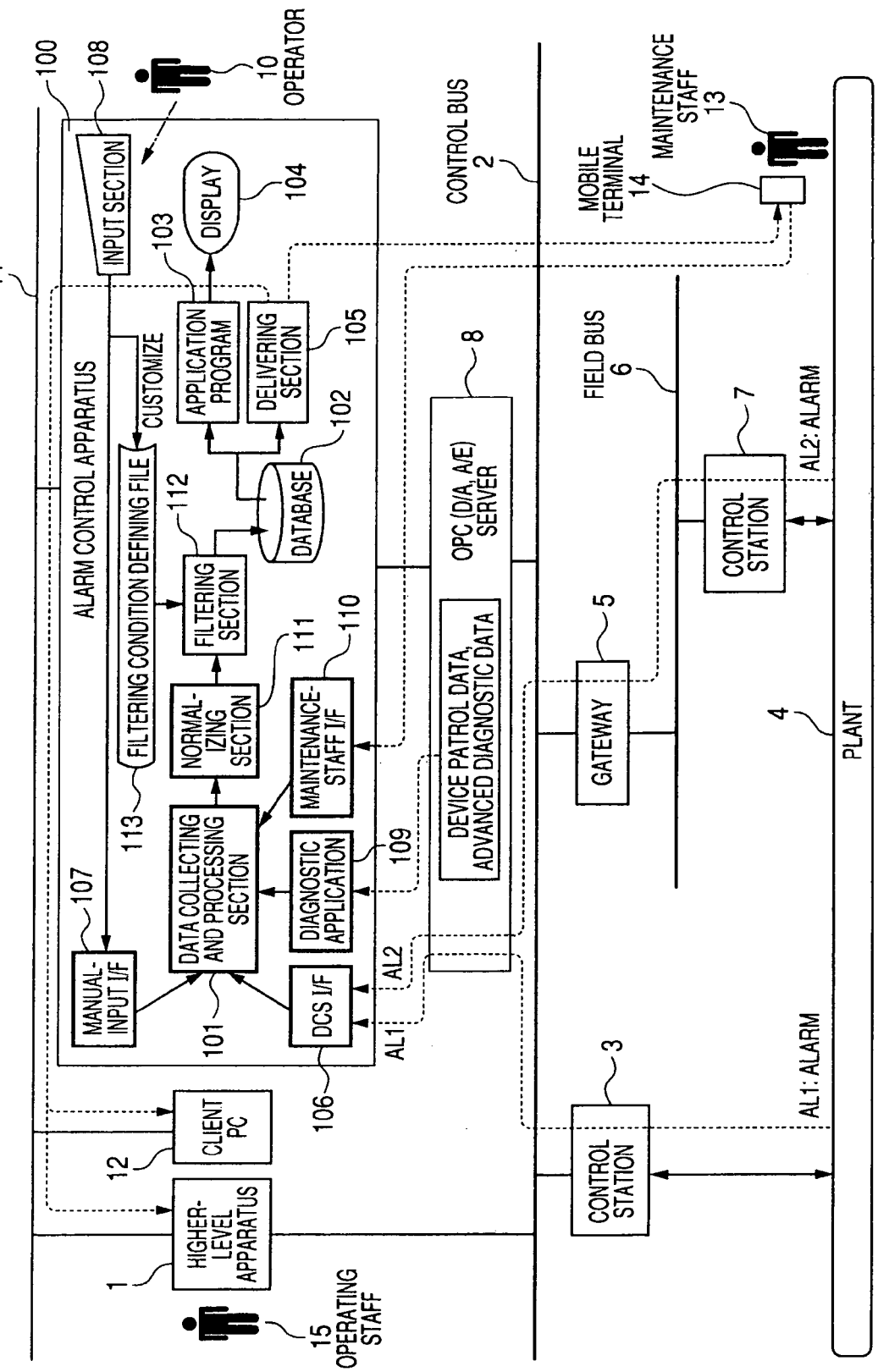
FIG. 1 is a functional block diagram showing an embodiment of a DCS to which an alarm control apparatus according to an embodiment of the invention is connected.

Hereinafter, the present invention will be described in detail with reference to the accompanying drawings. FIG. 1 is a functional block diagram showing an embodiment of a DCS to which an alarm control apparatus according to the invention is connected. The components identical with those of the related DCS which has been described with reference to FIG. 4 are denoted by the same reference numerals, and their description is omitted.

Referring to FIG. 1, 100 denotes an alarm control apparatus to which the present invention is applied. A database 102, an application program 103, a display 104, and a delivering section 105 have the same functions as the components 92 to 95 of the related apparatus shown in FIG. 4, respectively.

The reference numeral 101 denotes a data collecting and processing section, and 106 denotes a DCS interface which obtains the alarms AL1, AL2 generated by field equipments of the plant 4, and which passes the alarms to the data collecting and processing section 101. This function is identical with that of the data collecting and processing section 91 of the related apparatus, but support information including significance of a message, object information, phenomenon, cause, response, and the like is added to the alarms.

The reference numeral 107 denotes a manual-input interface into which the operator 10 inputs support information through input section 108 such as a keyboard. The information to be input includes: information related to maintenance of an equipment which cannot spontaneously generate an alarm; information required for maintenance and operation of an equipment which is not included in alarms being collected from the plant; equipment status information which is notified by the maintenance staff 13 to the operator 10; and the like. Moreover, the information to be input includes periodic patrol information which is related to the status of an equipment and which is found by the maintenance staff on periodic patrol.

The reference numeral 109 denotes a diagnostic application which requests a field communication server (not shown) to obtain device patrol data and advanced diagnostic data. Then, the diagnostic application produces support information related to diagnosis contents that cannot be obtained from diagnostic data contained in the alarms from the DCS, and passes the produced information to the data collecting and processing section 101.

The device patrol function will be briefly described. In a case where equipments of a plant conform to foundation fieldbus standard (FF-H1), diagnostic data issued by the equipments themselves do not contain information indicative of the meaning of the diagnostic data, and their detail descriptions are varied depending on the kinds of the equipments.

When the details of the diagnostic data issued by FF-H1 are to be inspected, a device patrol service can be used. In the service, a request for device scan is given to the field communication server of FF-H1, information including the significance of a message, object information, the phenomenon, the cause, the response, and the like is obtained from a file provided in the FF-H1 equipment itself, and the obtained information is added to the diagnostic data issued by the equipment.

The device scan includes the on-demand type in which a patrol is conducted on demand, and the constant-period type in which a patrol is conducted under preset conditions. In the scan of the constant-period type, a scan period in a unit of the significance of an object possessed by an equipment, and ON/OFF of the scan in a unit of an equipment can be designated on the screen of the alarm control apparatus.

The reference numeral 110 denotes a maintenance-staff interface which communicates with the mobile terminal 14 of the maintenance staff 13 to obtain maintenance information input into the mobile terminal 14, and which passes the information to the data collecting and processing section 101. Bus interconnection can be used in which the mobile terminal 14 is connected to the control bus 2, the field bus 6, and the general-purpose communication bus 11 via telephone connection, wireless connection, wireless LAN connection, and the like as a communicating section. The delivering section between the delivering section 105 of the alarm control apparatus and the mobile terminal 14 is configured in the same manner.

The data collecting and processing section 101 collects alarms and support information for the alarms via the DCS interface 106, the manual-input interface 107, the diagnostic application 109, and the maintenance-staff interface 110, and passes them to a normalizing section 111.

In the present invention, sources from which alarms and support information are collected by the data collecting and processing section 101 range over a wide variety of equipments, and formats of collected data are different depending on the sources generating the data. Therefore, the normalizing section 111 converts alarms and support information which are passed from the data collecting and processing section 101, into a common format which is sectioned by a standardized language such as a markup language (hereinafter, referred to as XML).

Figure 2:
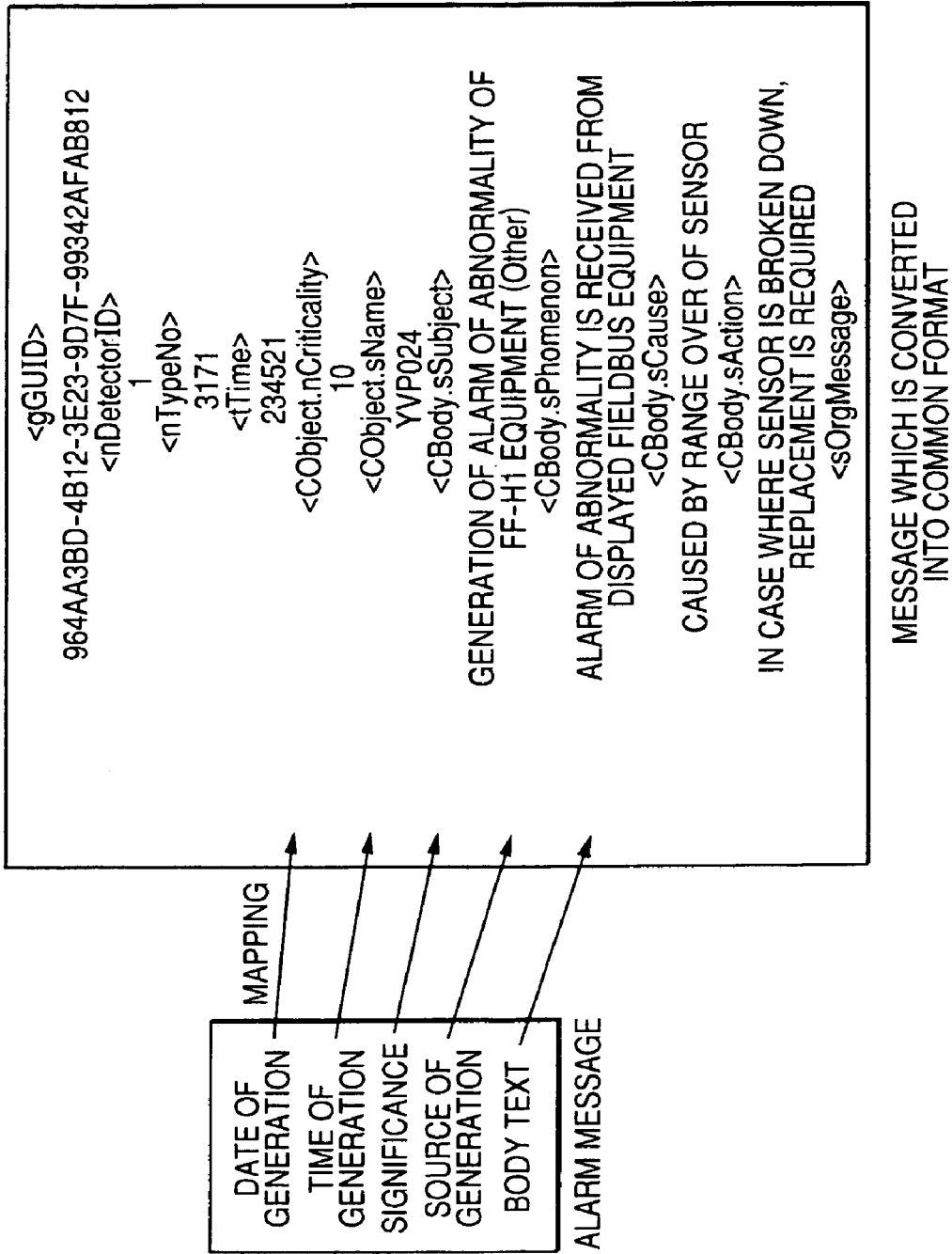
FIG. 2 is an image diagram showing a data structure of an alarm message which is converted into a common format by using an XML.

FIG. 2 is an image diagram showing a data structure of alarm messages which are converted into a common format by using the XML. From messages of information sources, date of generation, time of generation, significance, source of generation and a body text which are common items are extracted, and mapping in which the items are made correspondent to tags and property of the XML is executed so as to convert the messages into the common format.

The reference numeral 112 denotes a filtering section which can be provided in accordance with the needs of users. The filtering section is disposed between the normalizing section 111 and the database 102, and executes processes such as the stop of the delivery, a change of the significance, attachment of messages and the like on a specific tag or whole status of the data and the support information which have been converted into the common format, by means of a conditioning filtering process using an if-then rule.

The reference numeral 113 denotes a filtering condition defining file which is to be referred by the filtering section 112. The contents of the file are customized by the operator 10 through the input section 108, whereby filtering conditions can be freely set by the user.

FIGS. 3A and 3B are image diagrams illustrating data transition from generation of an alarm to delivery of the alarm. FIG. 3A shows a flow of data conversion, and FIG. 3B shows data formats in each of conversion steps. Usually, a physical entity which can generate an alarm is called an object.

A data indicative of an abnormal state of the object is called error data. Usually, error data is binary data, and has a format which, as it is, cannot be read by a human. The error date which is generated by an object is converted to information which can be read by a human, by the person who detects the error data and a transmitting section for transmitting the error data. Such information is called a message.

A message is configured by the following elements. The order of the elements varies for each error data.

(1) GUID (globally unique identifier) of message (2) GUID of parent message (3) ID of detection pattern (4) Classification No.

(5) Time of generation (6) Name of object of generation (7) ID of object of generation (8) Significance of object (9) Initial significance of message

(10) Initial message

The normalizing section regulates these elements in the order of (1) to (10), and converts them to data which are sectioned by the XML. The filtering section copies (1) to (8) of the elements as they are, as bibliographic data which cannot be changed, executes conditioning processes such as a change of the significance, attachment of messages, and a stop of the delivery on the initial significance of message of (9) and the initial message of (10), and then passes data to the delivering section.

According the normalizing process, it is possible to easily realize management of messages of alarms while giving unique IDs based on the common format, and, in the case where, linking with a certain alarm, another alarm is generated, management of messages of alarms in which the parent-child relationship of the alarms can be easily known.

The application of the above-described alarm control apparatus of the invention is not restricted to a PRM, and can be applied to a usual system which manages alarms. In the embodiment of FIG. 1, the alarm control apparatus 100 includes the application program 103 which uses stored data. Alternatively, a configuration may be employed in which an application program is provided only in the side of the client PC 12, and the alarm control apparatus 100 is used as a server for alarm management data.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An alarm control apparatus, comprising:
 a data collecting and processing section which collects alarm data generated from an equipment and collects additional support information of the equipment; and
 a normalizing section which normalizes the alarms and the support information into a common format, wherein the normalizing section converts the alarms and the support information into the common format which is sectioned by a markup language.

2. The alarm control apparatus according to claim 1, wherein the support information is information being input manually.

3. The alarm control apparatus according to claim 1, wherein the support information is diagnostic information of the equipment.

4. The alarm control apparatus according to claim 1,
 wherein the support information is status information of the equipment which is notified by a maintenance staff of the plant.

5. The alarm control apparatus according to claim 1, wherein the support information is periodic patrol information which is notified by a maintenance staff of the plant.

6. The alarm control apparatus according to claim 1, further comprising:
 a filtering section for performing a conditional filtering process on an output of the normalizing section.

* * * * *